Dec. 28, 1943.                    C. E. KERR                    2,338,040
                         CONTINUOUS JUICE PASTEURIZER
                    Filed March 3, 1941          2 Sheets-Sheet 1
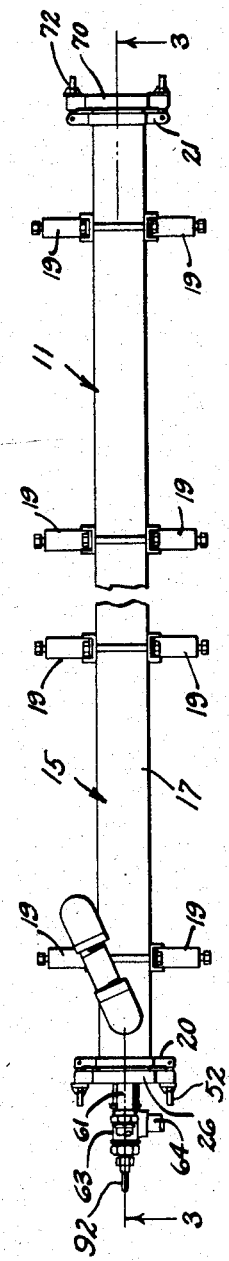
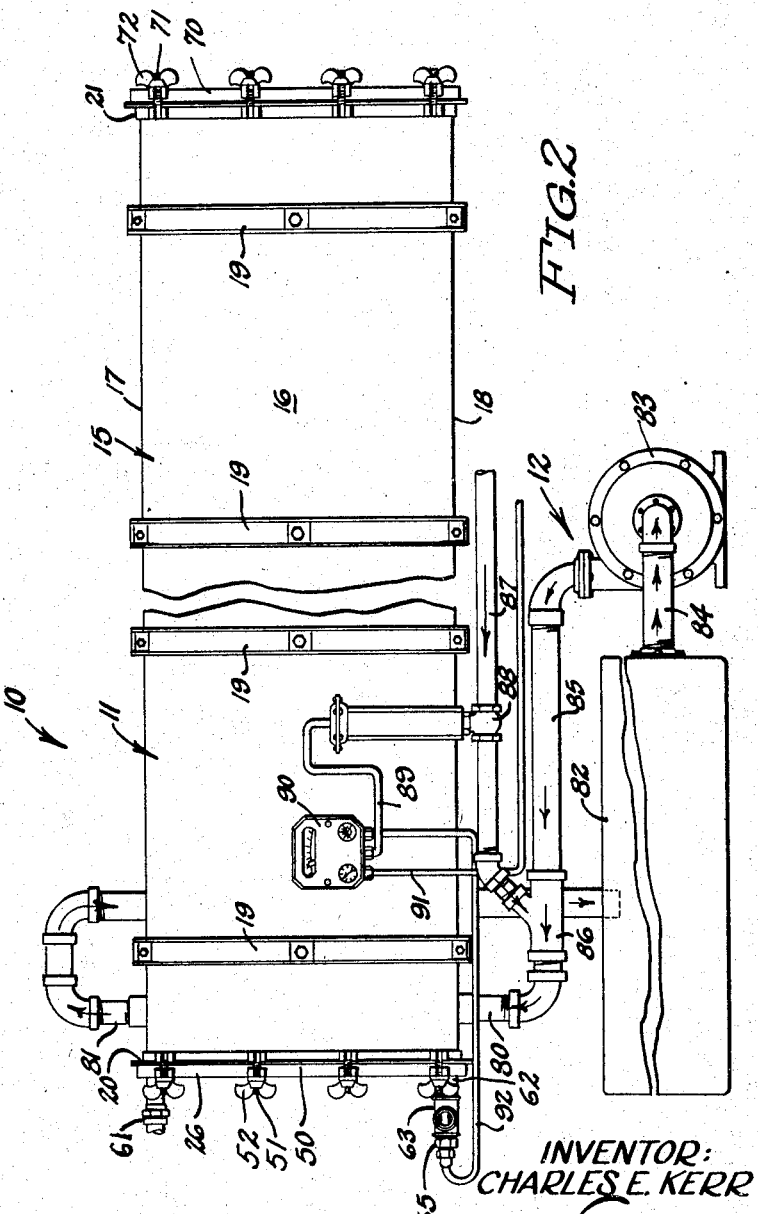
INVENTOR:
CHARLES E. KERR
BY
ATTORNEY

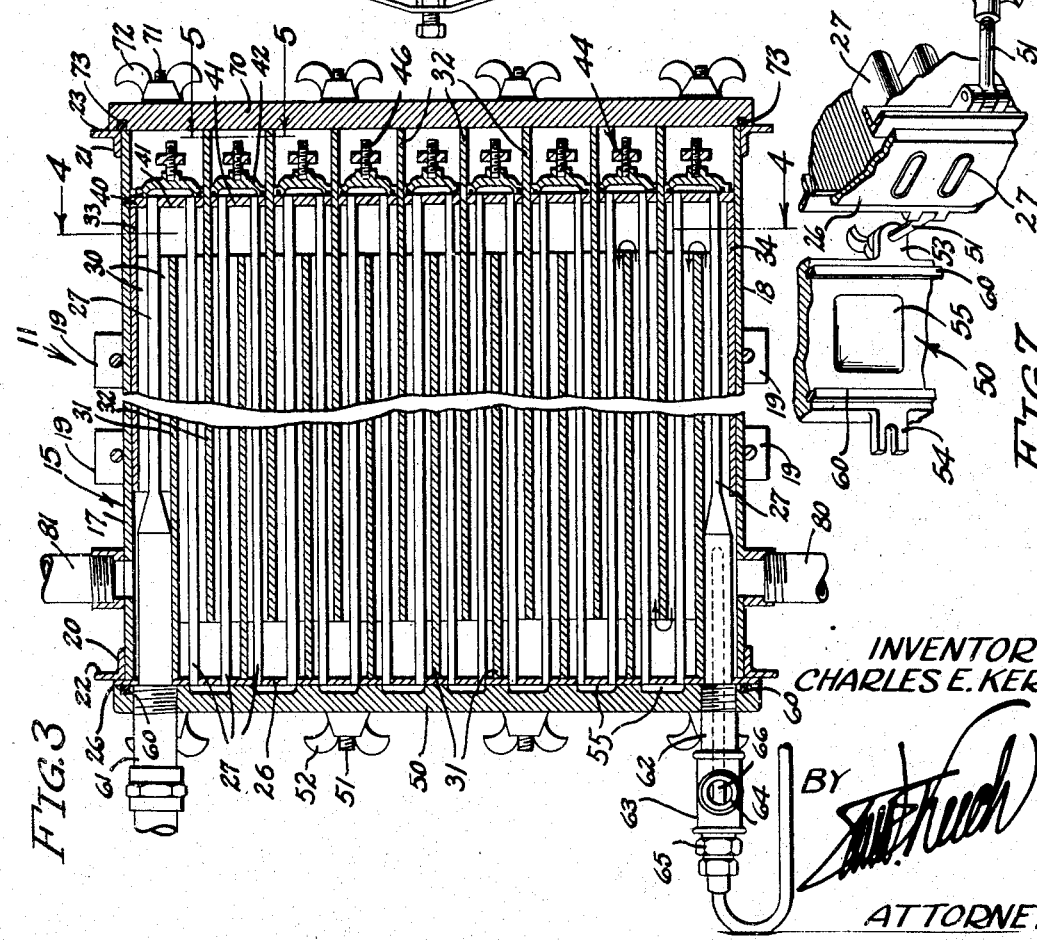

Patented Dec. 28, 1943

2,338,040

UNITED STATES PATENT OFFICE 2,338,040

CONTINUOUS JUICE PASTEURIZER

Charles E. Kerr, Hoopeston, Ill., assignor to Food Machinery Corporation, San Jose, Calif., a corporation of Delaware Application March 3, 1941, Serial No. 381,491

10 Claims. (Cl. 257—240)

This invention relates to the art of heat exchangers and has particular utility in the pasteurizing of fruit and vegetable juices.

It is an object of this invention to provide a novel pasteurizer having a high heat exchange efficiency.

It is a further object to provide a pasteurizer which is relatively simple in construction, economical to build, easy to clean, and having a long life.

It is another object of this invention to provide a pasteurizer which is adapted to perform its function in a relatively short period of time.

It is also an object of this invention to provide a heat exchanger having a novel, efficient, and economical mode of assembly and disassembly to permit the same to be quickly inspected and cleaned or repaired.

It is a further object of this invention to provide a heat exchanger in which access to a system of tubes embodied therewith for the purpose of cleaning or repairing these may be readily had with a relatively short shut-down in the operation of the device.

The manner of accomplishing the foregoing objects, as well as further objects and advantages, will be made manifest in the following description taken in connection with the following drawings, in which:

Fig. 1 is a plan view of a preferred embodiment of the invention.

Fig. 2 is a diagrammatic side elevational view of Fig. 1.

Fig. 3 is an enlarged longitudinal vertical sectional view taken on the line 3—3 of Fig. 1.

Fig. 4 is a cross-sectional view taken on the line 4—4 of Fig. 3.

Fig. 5 is an enlarged detail cross-sectional view taken on the line 5—5 of Fig. 3.

Fig. 6 is a horizontal detailed sectional view taken on the line 6—6 of Fig. 5.

Fig. 7 is a fragmentary perspective detail view illustrating the end plate at the head end of the device opened up to show the construction.

Fig. 8 is a fragmentary perspective detail view illustrating a tube connecting cap at the tail end of the machine with said cap removed to illustrate the construction.

Referring specifically to the drawings, and particularly to Fig. 2, the pasteurizer 10 of the invention is seen to include a heat exchanger 11 and a heating liquid circulating and temperature control system 12.

The heat exchanger 11 includes a shell 15 having side walls 16, a top wall 17, and a bottom wall 18. The side walls 16 are reinforced by clamps 19 which press inwardly on these walls for a purpose to be made clear hereinafter. The shell 15, when the heat exchanger 11 is disassembled, is open at its opposite ends and is provided as shown in Figs. 2 and 3 with perimetric angle irons 20 and 21 at its front and rear ends respectively, these angle irons providing flanges 22 and 23, outer faces of which are flush with the open ends of the shell 15.

Fitting against and removably secured to the flange 22 is a front end plate 26. Welded into suitable apertures formed in the end plate 26 is a series of juice conveying tubes 27, the uppermost and lowermost of these tubes being cylindrical in form where they are thus connected to the plate 26. The upper and lower tubes, except where so connected, have a flattened cross section, and the remainder of the tubes 27 are thus flattened throughout their length. The tubes 27 are supported within the shell 15 by longitudinal vertical fins 30 extending upwardly and downwardly from horizontal floors or baffle plates 31 and 32 which lie interspersed between the tubes 27 and are of a width to make a snug fit with the side walls 16 of the shell 15 and be rigidly held in place by the inward pressure of the clamps 19. Uppermost and lowermost baffle plates 33 and 34 are also provided which lie against the upper and lower shell walls 17 and 18 respectively and also are equipped with vertical fins 30 extending downwardly and upwardly respectively therefrom.

The tubes 27 lie between the adjacent edges of the fins 30 so as to be contacted thereby, these fins not only vertically spacing the tubes but preventing these tubes from expanding vertically in response to internal pressure of the juice traveling through these tubes.

In the assembly of the heat exchanger, the baffle plates 31 are located with their left ends flush with the flange 22 so that they make a substantially fluid-tight fit with the plate 26 when the latter is applied to the flange. Right hand ends of the baffle plates 31 are thus located inwardly from the plane of the right hand ends of the plates 33 and 34 which in turn are located inwardly a substantial distance from the outer faces of the tail end flange 23, as shown in Fig. 3.

The baffle plates 32, when assembled with the heat exchanger 11, are located with their right hand ends flush with the tail end flange 23 and with their left hand ends spaced from the front end plate 26 as clearly shown in Fig. 3.

The right hand ends of the tubes 27 are connected in pairs by couplings 40 which are disposed substantially midway between the right hand ends of the baffle plates 31 and the rear end of the shell. Each coupling 40 includes a base plate 41 into suitable apertures of which the tubes connected thereby extend and in which they are welded to this plate. Each such coupling also has a cap 42 provided with a gasket 43 and held down by a suitable clamp mechanism 44 to form a fluid connection between the ends of the tubes 27 welded to said plate. The clamp 44 includes a pair of posts 45 provided in the plate 41, a jack screw 46 having a handle 47, and a threaded cross bar 48 through which the screw 46 screws and which is adapted to be rapidly swung into or out of annular notches 49 provided in end portions of the posts 45 so as to permit the cap 42 to be quickly applied or removed in assembling or disassembling the coupling 40. Each coupling 40 rests on the baffle plate 32 immediately therebelow and is slidable thereon to compensate for expansion or contraction of the tubes 27 connected therewith during the operation of the pasteurizer 10.

The front end of the heat exchanger 11 is closed by a door or cover 50. This cover is secured in place (see Fig. 7) by eye bolts 51 and wing nuts 52 engaging with ears 53 and 54 on the cover. This cover has a series of recesses 55, each of which embraces a space on the front end plate 26 into which two of the tubes 27 connect and provides a relatively fluid-tight connection between the front ends of these tubes. A perimetric gasket 60 is provided in a suitable recess extending entirely around the inner face of the cover 50 and forms a fluid-tight seal preventing the escape of juice from between this cover and plate 36.

The cover 50 also receives a juice inlet pipe 61 at its upper end so that when the heat exchanger is assembled this pipe connects directly with the front end of the uppermost juice tube 27. The cover 50 similarly has a juice discharge pipe 62 which connects with the front end of the lowermost juice tube 27. The discharge pipe 62 connects with a T-fitting 63 from which a pipe 64 leads the pasteurized juice from the heat exchanger 11. Mounted in this fitting is a thermostat 65, the element 66 of which extends inwardly into the cylindrical portion of the lowermost juice tube 27 as clearly shown in Fig. 3.

The rear end of the heat exchanger 11 is adapted to be closed by a rear end wall, door or cover 70 which is held snugly against the flange 23 and the right hand ends of the baffle plates 32 by bolts 71 and wing nuts 72 mounted in the same manner as the cover 50 is similarly held in place on the front end of the heat exchanger. The cover 70 has a gasket 73 which is mounted in a perimetric recess extending around the edge of the inner face of the cover.

The heating liquid circulating system 12 includes a heating liquid inlet pipe 80 which enters the heat exchanger 11 through the bottom 18 thereof, and a heating liquid outlet pipe 81 which connects with the top wall 17 of the shell 15. The pipe 81 discharges into a heating liquid reserve tank 82 from which a pump 83 draws liquid through a pipe 84. The exhaust end of the pump 83 is connected through a pipe 85 and a Y-fitting 86 with the pipe 80. Also connected to the Y-fitting 86 is a steam pipe 87 having an air controlled valve 88 which is actuated through an air line 89 by a temperature controller and recorder 90. The controller 90 is in turn supplied with air through an air line 91 and is responsive to the thermostat 65 to which it is connected by a line 92.

Operation

The pasteurizer 10 of my invention is operated in the following manner:

The pipe 61 is connected with a source of juice to be pasteurized. This may be citrus juice, tomato juice, or any other fruit or vegetable juice or other liquid which requires pasteurizing. The T-fitting 63 is connected to canning equipment or any other device to which it is desired to deliver the pasteurized juice. The flow of juice through the heat exchanger 11 may be accomplished either by gravity or by a suitable pump, depending upon whether the juice originates above or below the level of pipe 61. The tank 82 is supplied with water and the pump 83 operated to set up a circulation of this water through the heat exchanger 11 and fill all the spaces in the heat exchanger surrounding the juice tubes 27. It is to be noted that the flow of heating liquid thus set up is in direct counter current to the flow of the juice.

Heat is supplied to the heating liquid through steam flowing through the pipe 87 which is connected to a boiler or any suitable source of steam. The control device 90 is set so as to keep the valve 88 open whenever the temperature of the juice leaving the heat exchanger 11 is below a given maximum, and stops the flow of steam whenever this temperature exceeds that maximum.

In pasteurizing juices generally, it is desired to raise these juices rapidly to a relatively high temperature—that is, above 190° F.—and maintain these at this temperature for a relatively short period and then to immediately place this juice in cans. The pasteurizer 10 in the commercial size at present in general use will handle 31 gallons of juice per minute and give a temperature rise of 140° F. In other words, if the juice enters at 55° F., it is discharged at 195° F. This result is obtainable in the compact space which the heat exchanger 11 occupies by virtue of the use of flat tubes 27 for conducting the juice and the division of the shell 15 into correspondingly flattened spaces by the baffle plates 31 and 32. Although accomplishing this unique result, the pasteurizer 10 is relatively inexpensive to build and maintain by virtue of a number of features thereof including the welding of the juice tubes 27 in a front end plate 26 by which these tubes can be handled as a unit when disassembled as well as in the process of assembling and disassembling. Another such feature is the supporting of the flattened juice tubes 27 by longitudinal fins 30 provided on horizontal baffle plates 31 and 32 which, though not connected directly with the tubes 27, support these against distortion which might otherwise be caused by internal pressure and at the same time prevent these tubes from sagging where the heat exchanger 11 is fairly long so as to keep these tubes properly centralized at all times in the heating liquid flowing thereover. The tail ends of the tubes 27 are also very economically connected by the couplings 40 which fit into the rectangular spaces provided therefor and prevent any substantial escape or circulation of the heating liquid into the spaces between the couplings 40 and the cover 70.

In assembling the heat exchanger 11, the clamps 19 are relaxed. The tubes 47 are then assembled with the head plate 26 and the couplings 40 are assembled upon the tail ends of these tubes. The fins 30 are attached as by welding to the upper and lower central portions of the baffle plates 31 and 32 and upon the lower and upper surfaces of the plates 33 and 34 respectively; and all of these baffle plates are assembled with the tubes 27 in the relation which these are to have in the heat exchanger 11. This complete assembly is then slid into the heat exchanger shell 15 just like a drawer is slid into a cabinet. The plate 26 is now secured to the flange 22 as by the use of suitable screws (not shown) passing through this plate and into this flange. The covers 50 and 70 are now swung into place and snugly clamped respectively against the plate 26 and the tail end of the shell 15. The clamps 19 are now tightened up so as to bind the plates 16 inwardly against the baffle plates 31 and 32 and rigidly hold these baffle plates in position in their proper assembled relation as shown in Figs. 3 and 4.

This mode of assembly of the heat exchanger 11 not only results in substantial savings in the production cost of the heat exchanger, but introduces economies in operation and maintenance. These latter result from the facility and speed with which the heat exchanger 11 may be entirely disassembled and reassembled for purposes of inspection and cleaning or repair, if necessary, of all of the internal surfaces of the device.

In the pasteurizing of certain products such as citrus juice, which the heat exchanger of my invention is particularly adapted for accomplishing, it is necessary at not infrequent intervals to have access to the interior surfaces of the tubes conducting the juice for the purpose of cleaning these. It is of considerable importance in this type of equipment therefore, that such access be possible without entirely dismantling the heat exchanger.

It can be readily seen from the foregoing description of the structure and operation of my invention that it is especially adapted to provide the ready access to the interior of the juice tubes above mentioned. It is also clear that this access may be obtained, the interior of the tubes cleaned and the heat exchanger returned to operating condition so quickly that the entire operation will require a shut-down of the heat exchanger for only a comparatively short period of time.

This tube-cleaning operation is accomplished by unscrewing the wing nuts 52 and 72 holding the covers 50 and 70 in place, and after disengaging the eye-bolts 51 and 71 along one side of the device and swinging these covers away from in front of the exchanger as shown in Fig. 7, unscrewing the jack screws 46, swinging the bars 48 and removing the coupling caps 42 as shown in Fig. 8. Both ends of the tubes 27 are now exposed to be worked upon so that the interior of the tubes can be cleaned as by extending a swab entirely through these tubes individually. The cleaning process finished, the re-application of the caps 42 and the closing and fastening of the covers 50 and 70 returns the heat exchanger of my invention to condition for resuming pasteurizing operations.

What I claim is:

1. In a heat exchanger, the combination of: flat tubular means extending back and forth in a plurality of turns to provide a continuous conduit for liquid to be heated in said exchanger; a shell enclosing said tubular means and having side walls lying relatively close on opposite sides of the plane in which said tubular means lies; baffle plates disposed between adjacent runs of said tubular means to provide a heating liquid passageway substantially co-extensive with and following the route of said conduit; and longitudinal fins provided on said baffle plates for supporting said tubular means against distortion owing to internal pressure and thereby maintaining said tubular means in flat condition.

2. A combination as in claim 1, in which said shell has a head cover and a plate, said cover and plate providing connecting means for said tubular means, at the head end of said heat exchanger; and a plurality of coupling means at the tail end of said heat exchanger, each of said coupling means connecting an adjacent pair of tubes embodied in said tubular means and being slidably disposed in a passageway between a pair of said baffle plates to accommodate expansion of said tubes due to changes in temperature in the operation of the heat exchanger.

3. In a heat exchanger, the combination of: a shell having parallel side walls; a series of parallel baffle plates disposed between said side walls and dividing the space inside said shell to form a series of passages connected in series at their opposite ends to provide a continuous passageway through said exchanger for heating liquid; a plate for covering the head end of said shell, said plate cooperating with alternate baffle plates to close and connect the adjacent ends of the aforesaid passages in pairs; flattened tubes, one of which lies in each of the passages of the aforesaid series; means associated with said head plate for connecting adjacent ends of said tubes in pairs; a cover for the tail end of said shell, the balance of said baffle plates extending farther toward said cover than those baffle plates engaging said head plate; coupling means for coupling in pairs the ends of said tubes which lie adjacent to the tail end of said shell, thereby completing a connection of said tubes to form a single continuous conduit for conveying a liquid to be heated through said heat exchanger; and means provided on said baffle plates for engaging the flattened faces of said tubes to maintain these tubes in flattened condition against the tendency of internal pressure of said tubes to expand the same.

4. A combination as in claim 3 in which the means for maintaining said tubes in flattened condition comprises longitudinal fins provided on said baffle plates, said fins engaging opposite flattened faces of said tubes.

5. In a heat exchanger, the combination of: a shell having parallel side walls; a series of parallel baffle plates disposed between said side walls and dividing the space inside said shell to form a series of passages connected in pairs at their opposite ends to provide a continuous passageway suitable for conducting heating fluid through said heat exchanger; a plate for covering the front end of said shell, said plate cooperating with alternate baffle plates to close and connect adjacent ends of the aforesaid passages in pairs; a series of flattened tubes, one of which lies in each of the passages aforesaid; means associated with said plate for connecting adjacent ends of said tubes in pairs; means on said baffle plates for engaging opposite faces of said tubes and preventing the distortion of the latter due to internal pressure and thus maintaining said tubes in flattened condition; a cover for the rear end of said shell, the balance of said baffle plates extending farther towards said cover than those baffle plates engaging said front end plate; and a plurality of individual coupling means for coupling in pairs the ends of said tubes which lie adjacent to the rear end of said shell, thereby completing a connection of said tubes to form a single continuous conduit suitable for conveying a liquid to be heated through said heat exchanger, each of said coupling means being disposed between an adjacent pair of said balance of said baffle plates and permitting access to the tubes connected thereby.

6. In a heat exchanger, the combination of: a shell having parallel side walls; a series of parallel baffle plates disposed between said side walls and dividing the space inside said shell to form a series of passages connected in pairs at their opposite ends to provide a continuous passageway suitable for conducting heating fluid through said heat exchanger; a plate for covering the front end of said shell, said plate cooperating with alternate baffle plates to close and connect adjacent ends of the aforesaid passages in pairs; a series of tubes, one of which lies in each of the passages aforesaid; means associated with said plate for connecting adjacent ends of said tubes in pairs; longitudinal fins on said baffle plates for engaging opposite faces of said tubes and preventing the distortion of the latter due to internal pressure tending to expand said tubes outwardly in the plate of said fins; a cover for the rear end of said shell, the balance of said baffle plates extending farther towards said cover than those baffle plates engaging said front end plate; and a plurality of individual coupling means for coupling in pairs the ends of said tubes which lie adjacent to the rear end of said shell, thereby completing a connection of said tubes to form a single continuous conduit suitable for conveying a liquid to be heated through said heat exchanger, each of said coupling means being disposed between an adjacent pair of said balance of said baffle plates and permitting access to the tubes connected thereby.

7. A heat exchanger comprising: side walls, top and bottom walls and front and rear end walls forming a rectangular chamber; spaced floors within said chamber forming a vertical series of superimposed horizontal passages, alternate floors terminating short of said end walls to connect pairs of adjacent passages at their front or rear ends to produce a continuous passageway; tubes disposed in said passages; means associated with said front end wall for forming a separate closed connection between the adjacent front ends of each group of said tubes disposed in one of the pairs of said passages which are connected together at their front ends as aforesaid; a series of couplings each of which lies within one of the spaces formed by joining adjacent rear ends of two passages as aforesaid, each coupling forming a closed connection between the tubes aforesaid disposed in said two passages; demountable cap means embodied in said couplings by which access may be readily had to the rear ends of the tubes connected thereby; and means for mounting said rear wall on said side, top and bottom walls to form a tight enclosure for the rear end of said chamber but permitting said rear end wall to be readily removed and giving access to said couplings.

8. A heat exchanger comprising: side walls, top and bottom walls and front and rear end walls forming a rectangular chamber; spaced floors within said chamber forming a vertical series of superimposed horizontal passages, alternate floors terminating short of said end walls to connect pairs of adjacent passages at their front or rear ends to produce a continuous passageway; tubes disposed in said passages; means embodied with said front end wall for forming a separate closed connection between the adjacent front ends of each group of said tubes disposed in one of the pairs of said passages which are connected together at their front ends as aforesaid, said means including a door embodied in said front end wall which is mounted upon said heat exchanger to be readily removable to give access to the front ends of all of said tubes; a series of couplings each of which lies within one of the spaces formed by joining adjacent rear ends of two passages as aforesaid, each coupling forming a closed connection between the tubes aforesaid disposed in said two passages; demountable cap means embodied in said couplings by which access may be readily had to the rear ends of the tubes connected thereby; and means for mounting said rear wall on said side, top and bottom walls to form a tight enclosure for the rear end of said chamber but permitting said rear end wall to be readily removed and giving access to said couplings.

9. A heat exchanger comprising: side walls, top and bottom walls and front and rear end walls forming a rectangular chamber; spaced floors within said chamber forming a vertical series of superimposed horizontal passages, alternate floors terminating short of said end walls to connect pairs of adjacent passages at their front or rear ends to produce a continuous passageway; tubes disposed in said passages; means associated with said front end wall for forming a separate closed connection between the adjacent front ends of each group of said tubes disposed in one of the pairs of said passages which are connected together at their front ends as aforesaid; a series of plates disposed just within said rear end wall, each plate lying within a space formed by joining adjacent rear ends of two passages as aforesaid and being slidably disposed in said space, rear ends of the tubes disposed in said two passages being joined by said plate and opening rearwardly through said plate; a series of caps one for each of said plates, each cap covering the rearward openings from said tubes; individually operable means for readily applying or removing each of said caps from its position aforesaid; and means for removably mounting said rear wall on said heat exchanger to permit access to be readily had to said caps and by removal of the latter, to the interior of said tubes.

10. A heat exchanger comprising: side walls, top and bottom walls and front and rear end walls forming a rectangular chamber; spaced floors within said chamber forming a vertical series of superimposed horizontal passages, alternate floors terminating short of said end walls to connect pairs of adjacent passages at their front or rear ends to produce a continuous passageway; tubes disposed in said passages; plate means embodied with said front end wall for joining the front ends of said tubes, the latter opening forwardly through said plate means; a cover also embodied in said front wall which when closed unites with said plate means to form recesses providing a separate closed connection between the adjacent front ends of each group of said tubes disposed in one of the pairs of said passageways which are connected together at their front ends as aforesaid; means for removably mounting said cover on said heat exchanger to permit said cover to be readily applied to function as aforesaid, or removed to permit access to be had to the front ends of said tubes; a series of plates disposed just within said rear end wall, each plate lying within a space formed by joining adjacent rear ends of two passages as aforesaid and being slidably disposed in said space, rear ends of the tubes disposed in said two passages being joined by said plate and opening rearwardly through said plate; a series of caps one for each of said plates, each cap covering the rearward openings from said tubes; individually operable means for readily applying or removing each of said caps from its position aforesaid; and means for removably mounting said rear wall on said heat exchanger to permit access to be readily had to said caps and by removal of the latter, to the interior of said tubes.

CHARLES E. KERR.